Nov. 6, 1945.　　　C. E. ASHTON　　　2,388,379
PARACHUTE HARNESS
Filed June 21, 1944
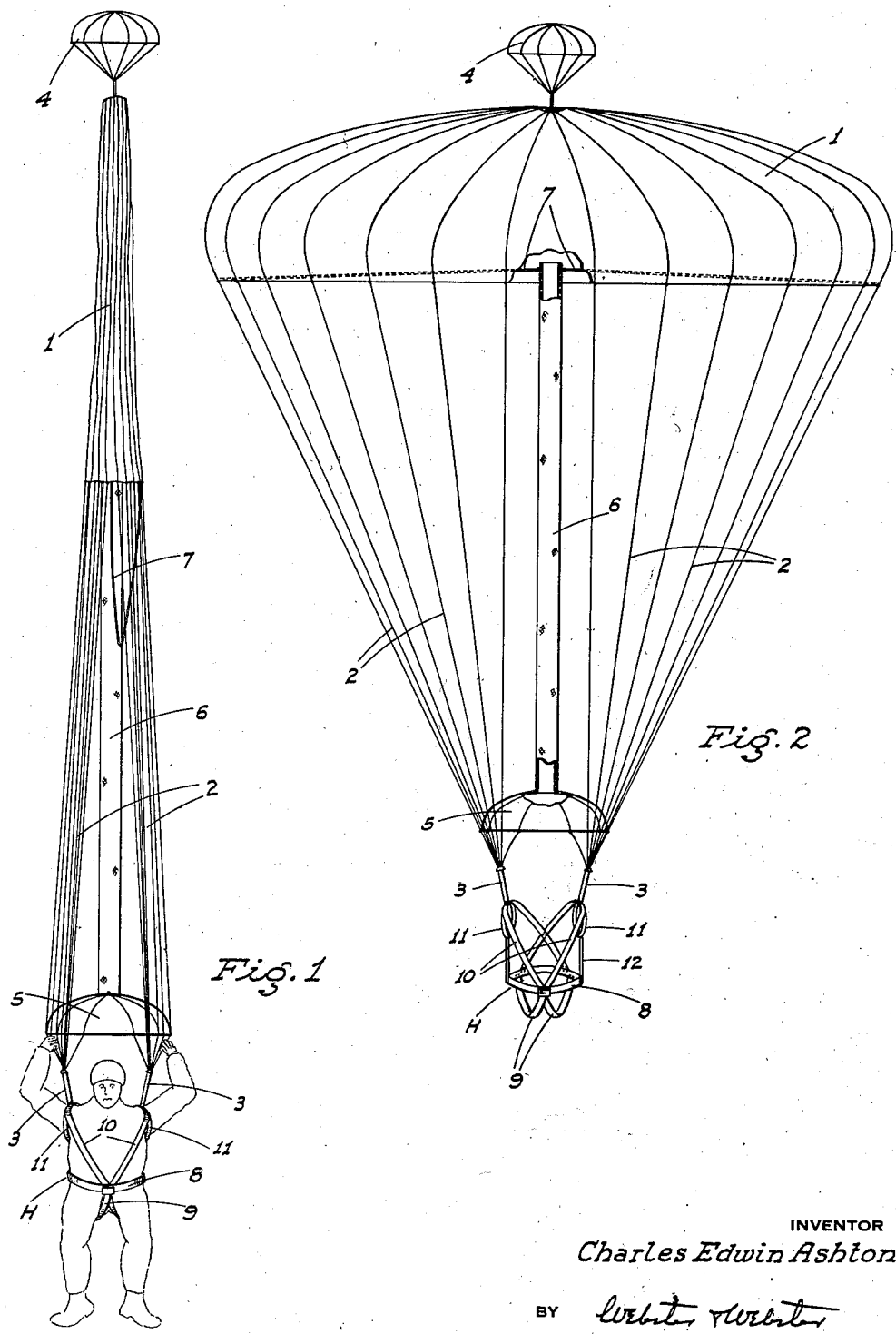
INVENTOR
Charles Edwin Ashton
BY
ATTORNEYS Patented Nov. 6, 1945

2,388,379

UNITED STATES PATENT OFFICE 2,388,379

PARACHUTE HARNESS

Charles Edwin Ashton, Stockton, Calif.

Application June 21, 1944, Serial No. 541,405

1 Claim. (Cl. 244—151)

This invention relates to parachutes, my main object being to provide an auxiliary parachute canopy, mounted in connection with the main parachute and adapted to be opened if necessary or desired by the occupant of the parachute harness, and which is associated with means arranged when said auxiliary canopy is opened to supply a blast of air to the interior of the main canopy before the latter opens, so as to speed the opening of the latter.

Another object is to provide an auxiliary parachute device, as defined above, which may be packed along with the main canopy without necessitating any change in the packing methods as now used, or in the pack generally.

A further object of the invention is to improve the construction of the parachute harness so that the shock or pull of the parachute is distributed more evenly to all parts of the harness than is now the case.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Figure 1 is an elevation of a parachute as suspended and before opening of the main canopy, showing my auxiliary canopy mounted in unitary connection therewith.

Figure 2 is a similar view, partly in section, and showing the main canopy opened.

Referring now more particularly to the characters of reference on the drawing, the parachute generally is of conventional construction and includes the main canopy 1 from which the various shroud lines 2 depend in groups to connections with straps 3 which project from the harness H above the shoulders. A pilot chute 4 is also mounted at the apex of the canopy, and functions as usual to draw the main canopy out of the pack and into position for opening, as shown in Fig. 1.

Especially when jumping from an airplane at relatively low altitudes, any delay in the opening of the main canopy is liable to be extremely hazardous for the airman, and for this reason it is my aim, as previously stated, to speed up the opening of the main canopy so that it will function to its fullest extent without delay.

I accomplish this end by mounting an auxiliary parachute canopy 5 within the area defined by the shroud lines 2 and secured at its periphery to certain ones of the shroud lines. The canopy 5 is mounted just high enough above the harness and straps 3 so as to be practically within reach of the upstretched arms of said occupant.

A flexible and collapsible fabric tube or conduit 6 of substantial diameter is secured on and extends upwardly from the apex of canopy 5, to an open-ended termination within the main canopy 1, being maintained in centralized relation at its upper end to said canopy by radial guy lines 7 extending from the tube to canopy 1 at the periphery thereof.

In operation, after the airman has jumped and the pilot chute has functioned to pull the main canopy out of the pack and above the airman, with the shroud lines substantially vertical, the operator reaches up and grasps the shroud lines, which are then relatively close together, and separates them as far as possible by stretching the arms laterally. This will pull the canopy 5 attached to the lines, to an open position as shown in Fig. 1. The air trapped by said canopy is immediately forced through tube 6 into the main canopy 1, where it will at once act to initially open said canopy as is desired. As soon as canopy 5 opens, the operator may let go the lines. The harness H is also of special construction and comprises a belt 8, leg engaging loop-straps 9 depending from the belt, and shoulder and body straps 10 upstanding from the belt and disposed in crossing relation at the back as shown. The various straps are only permanently secured to the belt at the back, and are detachably or releasably connected to the belt at the front, in connection with the ends of the latter, by the quick-release means shown in my copending application, Serial No. 535,817, filed May 16, 1944.

The canopy suspension straps 3 are connected to straps 10 at the top of the latter, and arm loops 11 depend from said straps 10, with tension straps 12 connecting the loops at the bottom and the belt at the sides.

It will therefore be seen that the tension or pull of straps 3 is transmitted not only to the shoulder straps directly, but also to the belt at a number of points about the same, and hence to the leg loops also. In this manner, the pull is distributed in a substantially even manner to all parts of the harness.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A parachute harness comprising a belt, shoulder straps connected to the belt at the front and back and in crossing relation to each other at the back, leg straps connected to the front and back of the belt, the shoulder and leg straps meeting at a common central point at the front of the belt, arm loops secured to the shoulder straps at the shoulder portion thereof and depending therefrom, canopy suspension straps secured to the shoulder straps adjacent the shoulder portion thereof and adapted for connection with the shroud lines of a parachute, and tension straps secured to the lower sides of the arm loops and to the belt and extending in substantial alignment with the suspension straps when the harness is secured to such shroud lines.

CHARLES EDWIN ASHTON.